United States Patent
Logan (10) Patent No.: US 7,857,352 B2
(45) Date of Patent: Dec. 28, 2010

(54) SYSTEMS AND METHODS FOR INSTALLING VEHICLE BODY ACCESSORIES ON CORRESPONDING VEHICLE BODIES

(75) Inventor: Geoffrey B. Logan, Portland, OR (US)

(73) Assignee: Bushwacker, Inc., Portland, OR (US)

( * ) Notice: Subject to any disclaimer, the term of this patent is extended or adjusted under 35 U.S.C. 154(b) by 289 days.

(21) Appl. No.: 12/132,544

(22) Filed: Jun. 3, 2008

(65) Prior Publication Data

US 2009/0243274 A1 Oct. 1, 2009

Related U.S. Application Data (60) Provisional application No. 61/040,437, filed on Mar. 28, 2008.

(51) Int. Cl.
*B62D 25/18* (2006.01)

(52) U.S. Cl. ...................... 280/848; 280/154

(58) Field of Classification Search ............... 280/848, 280/851, 154, 849, 850, 156; 296/191, 198; 57/716.5, 716.6, 716.7
See application file for complete search history.

(56) References Cited

U.S. PATENT DOCUMENTS

| | | | |
|---|---|---|---|
| 4,592,937 A | | 6/1986 | Nagata et al. |
| 4,904,014 A | * | 2/1990 | Azarovitz et al. ...... 296/146.15 |
| 5,238,268 A | * | 8/1993 | Logan ...................... 280/848 |
| 5,340,154 A | | 8/1994 | Scott |
| 5,353,571 A | * | 10/1994 | Berdan et al. ............... 52/716.5 |
| 5,613,710 A | | 3/1997 | Waner |
| 5,651,566 A | | 7/1997 | Arenhold |
| 5,823,553 A | * | 10/1998 | Thompson ............... 280/164.1 |
| 5,925,425 A | | 7/1999 | Nelson |
| 5,988,305 A | * | 11/1999 | Sakai et al. ............ 296/187.04 |
| 6,205,642 B1 | * | 3/2001 | Czirmer ..................... 280/848 |
| 6,722,730 B2 | | 4/2004 | Lydan et al. |
| 6,959,948 B2 | * | 11/2005 | Varnhagen et al. .......... 280/849 |
| 7,044,524 B2 | | 5/2006 | Luetze et al. |
| 7,144,075 B2 | | 12/2006 | Shishikura |

* cited by examiner

*Primary Examiner*—Hau V Phan
(74) *Attorney, Agent, or Firm*—Dascenzo Intellectual Property Law, P.C.

(57) ABSTRACT

Systems and methods for installing a vehicle-body accessory on a corresponding vehicle body include a vehicle-body accessory and an intermediate structural member configured to be positioned between the vehicle-body accessory and the corresponding vehicle body. The intermediate structural member includes one or more of a plurality of discrete projections and/or a plurality of discrete depressions for securing the structural member to the body and body accessory, such as with adhesive, spanning the projections and/or depressions. In some embodiments the structural member at least generally conforms to an internal recess, or channel, in the vehicle-body accessory. In some embodiments, the structural member includes at least one, optionally removable, alignment tab to facilitate proper installation of the intermediate structural member on a vehicle body.

25 Claims, 3 Drawing Sheets

Fig. 9

SYSTEMS AND METHODS FOR INSTALLING VEHICLE BODY ACCESSORIES ON CORRESPONDING VEHICLE BODIES

RELATED APPLICATION

The present application claims priority to U.S. Provisional Patent Application Ser. No. 61/040,437, which was filed on Mar. 28, 2008 and the complete disclosure of which is hereby incorporated by reference.

FIELD OF THE DISCLOSURE

The present disclosure relates to vehicle-body accessories, and more particularly to systems and methods for installing vehicle-body accessories on corresponding vehicle bodies.

BACKGROUND OF THE DISCLOSURE

Vehicle-body accessories are installed on vehicles for a variety of aesthetic and functional reasons. Examples of vehicle-body accessories include fender flares, body cladding, rails, ground effects, spoilers, stone guards, accent members, and other members attached to a vehicle body for aesthetic and/or functional reasons. Vehicle-body accessories may be installed by a vehicle manufacturer, for example as part of the original design of a vehicle, or they may be installed aftermarket as a customization of a vehicle.

Vehicle-body accessories may be designed and configured to be installed using adhesive material (e.g., glue or double-sided adhesive tape), using other mechanical fasteners (e.g., bolts, clips, screws), or using some combination of more than one coupling mechanism. One drawback to using adhesive material in general to install known vehicle-body accessories is the difficulty in properly positioning the vehicle-body accessory on the corresponding vehicle body without alignment mistakes and waste of adhesive material during such mistakes. One drawback to using double-sided adhesive tape to install known vehicle-body accessories is the tendency for the tape to completely detach from either the vehicle body or the vehicle-body accessory after only a portion of the tape has begun to detach, simply due to the weight of the vehicle-body accessory and/or the relative movement between the vehicle-body accessory and the vehicle body (e.g., due to vibrations and other inputs resulting from typical vehicle usage). In other words, once a portion of the tape has detached, the detachment has a tendency to propagate the full length of the tape, resulting in the vehicle-body accessory detaching from the vehicle body.

SUMMARY OF THE DISCLOSURE

The present disclosure is directed to vehicle-body accessories and systems and methods for installing vehicle-body accessories. Systems according to the present disclosure include one or both of a vehicle-body accessory and an intermediate structural member configured to be positioned between the vehicle-body accessory and a corresponding vehicle for the installation of the accessory on the vehicle body. Methods according to the present disclosure include securing adhesive material to an intermediate structural member, positioning the intermediate structural member in a predetermined position relative to the corresponding vehicle body, and positioning the vehicle-body accessory in a predetermined position relative to the intermediate structural member.

Intermediate structural members have a first side and a second side, and may include a plurality of discrete projections extending from the first side, each projection having a support surface. The support surfaces of one or more subsets of the plurality of discrete projections may generally lie within a common plane and correspond to one of an inner surface of a corresponding vehicle-body accessory and an outer surface of a corresponding vehicle body. Some embodiments of intermediate structural members include a plurality of depressions on the second side of the intermediate structural member, the depressions corresponding to the plurality of discrete projections extending from the first side. Some embodiments of intermediate structural members include a plurality of discrete projections extending from both the first side and the second side of the intermediate structural member. Some embodiments include a plurality of depressions on one or both sides of the intermediate structural member, without corresponding projections on the opposite side thereof.

DETAILED DESCRIPTION AND BEST MODE OF THE DISCLOSURE

Figure 1:
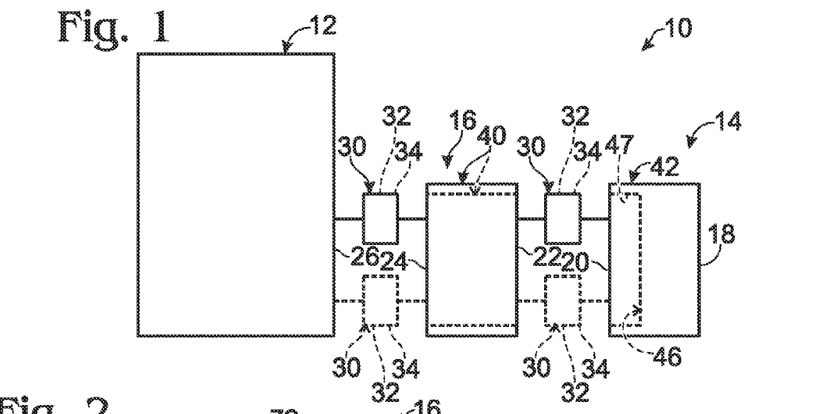
FIG. 1 is a schematic diagram illustrating systems for installing vehicle-body accessories on corresponding vehicle bodies according to the present disclosure, together with a vehicle body.

Systems for installing vehicle-body accessories on corresponding vehicle bodies are schematically illustrated in FIG. 1 and are generally indicated at 10. As illustrated, systems 10 may be coupled to a vehicle body 12. Systems 10 may include a vehicle-body accessory 14 and an intermediate structural member 16 configured to be positioned between a body accessory and a corresponding vehicle body.

Vehicle-body accessories 14 may be described as having an outer side 18 configured to generally face away from the corresponding vehicle body. For example, an outer side of a vehicle-body accessory may provide aesthetic features that are configured to enhance the appearance of a vehicle. Accessories 14 may also be described as having an inner side 20 configured to generally face toward the corresponding vehicle body. As used herein, "outer" and "inner" generally refer to the radial directions away from and toward the corresponding vehicle body, respectively. However, it is within the scope of the present disclosure that various components of systems according to the present disclosure may include contoured and/or irregular surfaces and shapes having portions that do not necessarily face directly away from or directly toward a corresponding structure such as a vehicle body, and the schematic representations of FIG. 1 are just that—schematic.

Similarly, intermediate structural members 16 may be described as having an outer side 22 configured to generally face and compliment at least a portion of the inner side 20 of a corresponding vehicle-body accessory 14. Stated differently, the shape and configuration of an outer side of an intermediate structural member 16 may generally conform to at least a portion of the inner side of a corresponding vehicle-body accessory, so that with an appropriate coupling mechanism, as discussed below, the intermediate structural member may be secured to the corresponding vehicle-body accessory.

Members 16 may also be described as having an inner side 24 configured to generally face and compliment a portion 26 of a corresponding vehicle body 12. For example, in a system 10 according to the present disclosure having a vehicle-body accessory in the form of a fender flare, portion 26 may correspond to the area of a vehicle body generally adjacent a wheel well. The present disclosure is not limited to vehicle-body accessories in the form of fender flares, and as mentioned above, other non-exclusive examples of vehicle-body accessories include (but are not limited to) fender flares, body cladding, rails, ground effects, spoilers, stone guards, accent members, and other members attached to a vehicle body for aesthetic and/or functional reasons. Vehicle-body accessories may be one-piece accessories, two-piece accessories, three or more piece accessories, or may include any number of pieces and/or distinct members thereof in any suitable configuration as may be desired for a particular system 10.

Systems 10 according to the present disclosure may further include coupling mechanisms 30 for securing accessories 14 to intermediate structural members 16 and for securing intermediate structural members 16 to corresponding vehicle bodies 12. Illustrative non-exclusive examples of suitable coupling mechanisms include (but are not limited to) adhesive materials 32 and other mechanical fasteners 34. Non-exclusive examples of adhesive materials include (but are not limited to) double-sided adhesive tape, glue, and epoxy. Non-exclusive examples of double-sided adhesive tape include 3M™ Acrylic Foam Tapes, which have acrylic adhesives with visoelastic foam cores. Non-exclusive examples of other mechanical fasteners include clips, bolts, and screws.

As schematically illustrated in FIG. 1, systems 10 according to the present disclosure may include one or more discrete instances of a coupling mechanism 30 both between a body accessory and an intermediate structural member and between an intermediate structural member and a corresponding vehicle body. Additionally, systems 10 may (though are not required to) include one or more types of coupling mechanism in any suitable combination thereof. For example, a system 10 may include only adhesive material 32, which may be in the form of double-sided adhesive tape. Additionally or alternatively, a system 10 may include an adhesive material 32 between the accessory 14 and the intermediate structural member 16 and may include another type of mechanical fastener 34 (e.g., bolts) between the intermediate structural member and the corresponding vehicle-body. Additionally or alternatively, a system 10 may include an adhesive material 32 in the form of epoxy between the accessory 14 and the intermediate structural member 16 and may further include an adhesive material 32 in the form of double-sided adhesive tape between the intermediate structural member and the corresponding vehicle-body. Other combinations are equally within the scope of the present disclosure.

In embodiments where only adhesive material is used to secure both a vehicle-body accessory to an intermediate structural member and an intermediate structure member to a corresponding vehicle, such systems may be described as not requiring structural modification to the corresponding vehicle body or to the vehicle-body accessory. For example, such systems may not require the introduction of holes into the corresponding vehicle body or into the vehicle-body accessory, for example, for bolts, screws, or other mechanical fasteners to secure an accessory to a vehicle body. Furthermore, neither the accessory nor the vehicle body are damaged during installation or removal of the accessory.

In some embodiments, as schematically illustrated in FIG. 1, an intermediate structural member 16 may be sized to be substantially coextensive with a vehicle-body accessory 14. Stated differently, and as indicated in solid lines in FIG. 1, an intermediate structural member 16 may include an outer periphery, or outer edge, 40 that is substantially similar in size and shape as an outer periphery, or outer edge, 42 of a corresponding vehicle-body accessory 14. In such embodiments, the intermediate structural member may (but is not required to) be somewhat visible when the system is properly installed on a corresponding vehicle body. In other words, an outer periphery of an intermediate structural member may form at least a portion of the aesthetic appearance of an installed system according to the present disclosure.

Additionally or alternatively, as schematically illustrated in dashed lines in FIG. 1 at 40, an intermediate structural member 16 may include an outer periphery that is smaller than an outer periphery 42 of a corresponding vehicle-body accessory 14. In some such embodiments, the intermediate structural member may be sized to be substantially concealed by the corresponding vehicle-body accessory when it is installed on a corresponding vehicle body, and therefore may not form a portion of the aesthetic appearance of an installed system according to the present disclosure. Additionally or alternatively, the intermediate structural member may be sized to be generally housed within the vehicle-body accessory when the vehicle-body accessory is coupled to the vehicle body. In such embodiments, as schematically illustrated in FIG. 1 at 46, the vehicle-body accessory may include a pocket, channel, and/or recess, that is configured to generally receive, surround, encapsulate, and/or house the intermediate structural member. In such an embodiment, the outer edge 40 of the intermediate structural member may, but is not required to, engage an inner edge 47 of the recess 46 in the vehicle-body accessory.

Figures 2, 3, 4, 5, 6:
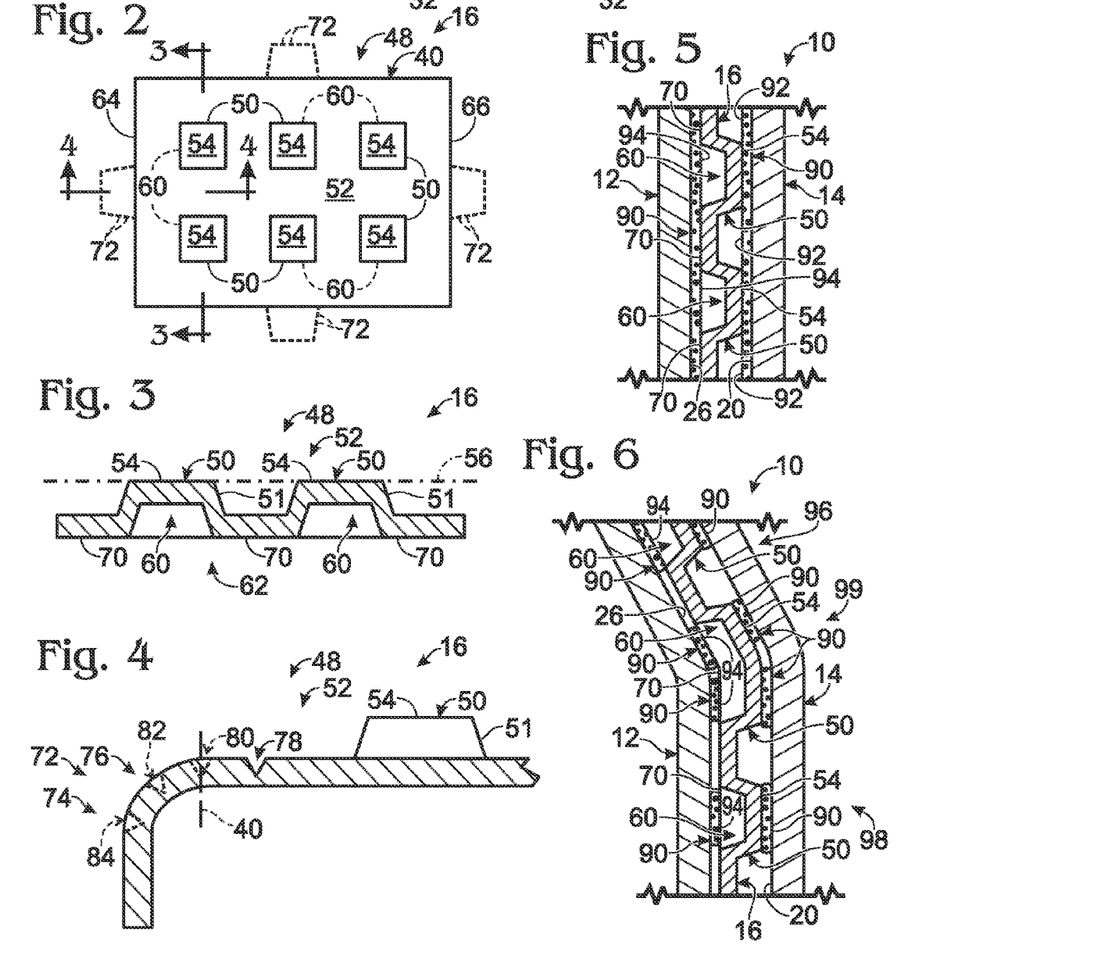
FIG. 2 is a schematic plan view schematically illustrating intermediate structural members of systems for installing vehicle-body accessories on corresponding vehicle bodies according to the present disclosure.
FIG. 3 is a cross-sectional view of the schematically illustrated intermediate structural members of FIG. 2, taken along 3-3.
FIG. 4 is a cross-sectional view of the schematically illustrated intermediate structural members of FIG. 2, taken along 4-4 and illustrating optional alignment tabs.
FIG. 5 is a cross-sectional view of a portion of a non-exclusive example of a system for installing vehicle-body accessories on corresponding vehicle bodies according to the present disclosure, shown installed on a vehicle body.
FIG. 6 is a cross-sectional view of a portion of another non-exclusive example of a system for installing vehicle-body accessories on corresponding vehicle bodies according to the present disclosure, shown installed on a vehicle body.

FIG. 2 schematically illustrates intermediate structural members 16 according to the present disclosure, and FIGS. 3 and 4 somewhat less schematically illustrate cross-sectional views of non-exclusive examples of intermediate structural members 16 according to the present disclosure. As illustrated, intermediate structural members 16 may include a body 48 having a plurality of discrete projections 50 extending from, or on, a first side 52 of the body 48. "A plurality of discrete projections" refers to a plurality of spaced apart projections, each projection having its own distinct structure extending from the body of the intermediate structural member. Body 48 may additionally or alternatively be referred to as a base 48 from which projections 50 extend and/or into which the subsequently discussed depressions 60 extend.

First side 52 may correspond to either the outer side 22 or the inner side 24 of the intermediate structural member (as illustrated in FIG. 1 and discussed above), depending on a particular configuration of a system 10 according to the present disclosure. That is, in some embodiments of intermediate structural members 16, a plurality of discrete projections 50 may extend from the outer side 22 of a member 16 and be configured to extend toward and generally compliment an inner side 20 of a corresponding vehicle-body accessory. Additionally or alternatively, in some embodiments of intermediate structural members 16, a plurality of discrete projections 50 may extend from the inner side 24 of a member 16 and be configured to extend toward and generally compliment a portion 26 of a corresponding vehicle body 12.

Additionally or alternatively, in some embodiments of intermediate structural members 16, a plurality of discrete projections 50 may extend from both the outer side 22 and the inner side 24 of a member 16, with a first subset of discrete projections configured to extend toward and generally compliment an inner side 20 of a corresponding vehicle-body accessory and a second subset of discrete projections configured to extend toward and generally compliment a portion 26 of a corresponding vehicle body 12.

Additionally or alternatively, some embodiments of intermediate structural members may include a plurality of discrete depressions 60, as schematically illustrated in FIG. 2. Such embodiments may include depressions on one of, or both of, the inner side and the outer side of the intermediate structural member. In some embodiments, an intermediate structural member may include projections 50 on one side and depressions 60 on the other side.

The schematic illustration of FIG. 2 graphically represents all of the aforementioned possible configurations of intermediate structural members 16 relating to the presence of projections 50 and/or depressions 60 on one or both sides of an intermediate structural member.

As illustrated in FIG. 3, each projection 50 may be defined by side walls 51 extending from body 48 and a distal support surface 54 that is spaced from the body 48 by the side walls. Support surfaces 54 may be configured to compliment a corresponding surface or structure of either a vehicle-body accessory or a vehicle body, depending on the particular configuration of system 10. By "compliment," it is meant that the support surface is sized and shaped to sufficiently or even completely conform to the corresponding geometry (size, shape, etc.) of the surface or region of the corresponding surface or structure of the vehicle-body accessory or vehicle body to provide support thereto and to provide a surface of contact for securing the surfaces together. As discussed, this securing may include using an adhesive, adhesive tape, or other substrate or structure that couples the surfaces together in a supporting relationship even if direct physical contact between the surfaces is not present in all embodiments.

In some embodiments, though it is not required, support surfaces 54, or a subset of support surfaces 54, may be generally planar. In some embodiments, the support surfaces of at least a subset of the discrete projections may generally lie within a common plane 56, as illustrated in FIG. 3. As used herein to "generally lie within a common plane" includes configurations wherein the generally planar surfaces are configured to compliment a slightly curved surface such as may be found on an inner side 20 of a corresponding vehicle-body accessory 14 or on a portion 26 of a corresponding vehicle body 12, and is not limited to the support surfaces lying precisely within a common plane.

Additionally or alternatively, as mentioned, intermediate structural members 16 may include a plurality of depressions 60. Depressions 60 may extend into, or on, a second side 62 of the intermediate structural member. In embodiments incorporating both of a plurality of discrete projections 50 and a plurality of depressions 60, the plurality of depressions may be described as corresponding to the plurality of discrete projections, and vice versa, as schematically illustrated in FIG. 3. As shown in FIG. 3, each projection 50 extends away from body 48 to define a depression 60 banded by the interior surfaces of support surface 54 and side walls 51.

In some embodiments of intermediate structural members 16, the plurality of discreet projections 50 and/or the plurality of depressions 60 may collectively span a substantial length of the intermediate structural member. Stated differently, a plurality of projections and/or depressions may (but are not required to) collectively span from somewhat adjacent a first edge 64 of body 48 to somewhat adjacent a second edge 66 of body 48, generally opposite or a distance away from the first edge, as schematically illustrated in FIG. 2. In contrast, a single projection and/or a single depression that is sized to extend from somewhat adjacent a first edge to somewhat adjacent an opposite second edge would not be considered a plurality of projections and/or a plurality of depressions that span a substantial length of an intermediate structural member. By "somewhat adjacent," it is meant to include configurations where the projection/depression begins at an edge of the outer periphery of the body, and configurations where the projection/depression begins recessed from, or spaced interiorly from, the edge of the outer periphery.

Additionally or alternatively, the plurality of discrete projections and/or the plurality of depressions may span an intermediate structural member in two dimensions, as schematically illustrated in FIG. 2. By this it is meant that the plurality of discrete projections and/or depressions may include two or more spaced-apart projections and/or two or more spaced-apart depressions that collectively define a triangular or rectilinear or other non-linear surface, as opposed to a plurality of projections or depressions that are arranged only in a single linear orientation. In some embodiments, the plurality of discrete projections and/or depressions may collectively extend across the base from somewhat adjacent all of the edges of the outer periphery of the body of the intermediate structural member. However, it is equally within the scope of the present disclosure that an intermediate structural member may include a plurality of discrete projections and/or a plurality of depressions that span an intermediate structural member only in a single direction, for example, in a single row of projections, whether in a straight line or in a circuitous line.

In embodiments including a plurality of depressions 60, second side 62 may be described as having portions 70 adjacent the depressions 60, some of which may be described as being between two or more of the plurality of depressions, as schematically illustrated in FIG. 3. Portions 70 may therefore be configured to generally face and compliment either an inner side 20 of a corresponding vehicle-body accessory or a portion 26 of a corresponding vehicle body 12, depending on the particular configuration of the intermediate structural member 16. Accordingly, portions 70 may also be described as support surfaces and may additionally or alternatively be referred to as spanning portions or spanning regions 70 that extend between adjacent depressions and/or between a depression and the outer periphery 40 of the body.

As schematically illustrated in FIG. 2, intermediate structural members 16 according to the present disclosure may optionally include one or more alignment tabs 72 extending from the outer periphery 40 of the intermediate structural member. These one or more alignment tabs may take any suitable configuration such that they are configured to engage corresponding structure on a corresponding vehicle body 12 to position, or guide the positioning of, intermediate structural member 16 in a predetermined position relative to the vehicle body. Non-exclusive examples of structure on a corresponding vehicle body include, but are not limited to, edges of a vehicle body such as edges of a wheel well, edges of a door frame, edges of a door, edges of a body panel, depressions within a body panel, features within a body panel, contours of a body panel, etc. As somewhat schematically illustrated in FIG. 2, accessory 16 may include one or more alignment tabs 72 extending from one, two, or more (including all) edges of body 48.

In other words, the alignment tabs may aid installation of systems 10 according to the present disclosure by providing a mechanism or guide for ensuring the proper alignment of the intermediate structural member, and thus of a corresponding vehicle-body accessory that is secured to and supported by the intermediate body member. Stated differently, inclusion of alignment tabs 72 may prevent misalignment of the intermediate structural member and corresponding vehicle-body accessory and thereby avoid the need for repeated attempts of proper alignment and further avoid wasting of adhesive material in such repeated attempts. For example, in the non-exclusive example of a system 10 including a vehicle-body accessory in the form of a fender flare, the corresponding intermediate structural member may include one or more alignment tabs that are configured to engage one or more portions of a corresponding vehicle's wheel well. Accordingly, during installation of the system, tabs 72 may guide or align the intermediate structural member to be positioned in a predetermined position relative to the wheel well, such that the fender flare is subsequently properly positioned when secured to the intermediate structural member.

A non-exclusive example 74 of an alignment tab 72 is illustrated in FIG. 4 and may be described as a tab, a flange, or a hook. In some embodiments of intermediate structural members 16 (though it is not required), the optional one or more alignment tabs 72 may be configured to be separated, or removed, from a remainder of the intermediate structural member, for example, after the intermediate structural member is properly positioned relative to and secured to a corresponding vehicle body. Stated differently, an intermediate structural member 16 may include removal structure 76 that facilitates separation, or removal, of the optional alignment tab(s) after or during installation. Accordingly, during installation, an alignment tab may serve its intended function (i.e., to properly align the intermediate structural member relative to the corresponding vehicle body), and then it may be removed so that it does not detract from the aesthetic features of the system. In some embodiments, the alignment tabs may need to be removed for proper positioning and securement of the vehicle-body accessory to the intermediate structural member, but this is not required to all embodiments with alignment tabs.

Intermediate structural members according to the present disclosure that include one or more optional alignment tabs 72 that are configured to be separated from a remainder of the intermediate structural member may include removal structure 76 in the form of a thickness that is reduced between the alignment tab and the remainder of the intermediate structural member. This reduced thickness may facilitate (such as by cutting, tearing, fatiguing, bending, etc. in the region of reduced thickness) separation of the alignment tab from the remainder of the intermediate structural member when so desired during or after the installation of a system 10. Additionally or alternatively, the removal structure may include a score between an alignment tab and a remainder of the intermediate structural member. Additionally or alternatively, the removal structure may include a perforation between an alignment tab and a remainder of the intermediate structural member and/or a region of reduced-strength material. Other configurations are equally within the scope of the present disclosure, and any suitable structure that generally facilitates separation, or removal, of an alignment tab from a remainder of the intermediate structural member may be utilized in embodiments where such a function of the optional alignment tab is so desired.

As schematically illustrated in FIG. 4, intermediate structural members 16 that include optional alignment tabs that are configured to be removed may include removal structure 76 in various optional positions. For example, as illustrated at 78, structure 76 may be positioned so that an alignment tab separates from a remainder of the intermediate structural member at a position generally inside or recessed within the outer periphery 40 of the intermediate structural member. Additionally or alternatively, as illustrated at 80, removal structure 76 may be positioned to generally correspond, or be aligned, with a substantial portion of the periphery 40 of the intermediate structural member.

Additionally or alternatively, as illustrated both at 82 and at 84, removal structure 76 may be positioned outside of, or projecting laterally from, a substantial portion of the periphery 40 of the intermediate structural member. In such embodiments, the alignment tab may be described as being only partially separable, or removable, from a remainder of the intermediate structural portion, and may still provide structure that engages corresponding structure on a vehicle body after removal of a portion of the alignment tab.

FIGS. 5 and 6 illustrate cross-sections of two non-exclusive examples of systems 10 according to the present disclosure, both shown installed on a corresponding vehicle body 12. Both embodiments include an intermediate structural member 16 that includes a plurality of projections 50 having support surfaces 54 that are configured to generally face and compliment the inner side 20 of the vehicle-body accessory. The intermediate structural members of FIGS. 5 and 6 also include a plurality of depressions 60 corresponding to the plurality of discrete projections 50 and portions 70 adjacent to the plurality of depressions that are configured to generally face and compliment portion 26 of vehicle body 12.

The embodiments of FIGS. 5 and 6 both include optional adhesive material 32 in the form of lengths of adhesive tape 90. In the perspective of FIG. 5, the cross-section is taken along a span of discrete projections 50 and corresponding depressions 60, each having a length of adhesive tape spanned there across. In other words, the cross-section of FIG. 5 is taken along a longitudinal length of the lengths of adhesive tape 90. In the perspective of FIG. 6, the cross-section is taken transverse to three spans of discrete projections 50 and corresponding depressions 60. That is, FIG. 6 represents three spans of discrete projections 50 and corresponding depressions 60 extending into and out of the page. In other words, the cross-section of FIG. 6 is taken transverse to the longitudinal lengths of the lengths of adhesive tape 90.

As perhaps best seen in the perspective of FIG. 5, lengths of adhesive tape 90 may be sized to span at least a subset of the plurality of discrete projections 50. Stated differently, a length of adhesive tape 90 may be secured to at least a subset of the support surfaces 54 of the plurality of discrete projections 50. Accordingly, the one or more lengths of adhesive tape 90 spanning the projections 50 may include sections 92 that are generally facing the intermediate structural member but that are not directly engaged with the intermediate structural member. In other words, a length of adhesive tape, when spanned across at least a subset of the plurality of discrete projections 50, will include sections 92 that are not directly stuck to a surface of the intermediate structural member.

Additionally, lengths of adhesive tape 90 may be sized to span at least a subset of the plurality of depressions 60. Stated differently, a length of adhesive tape 90 may be secured to at least a subset of portions 70 of the intermediate structural member. Accordingly, the one or more lengths of adhesive tape 90 spanning depressions 60 may include sections 94 that are generally facing the intermediate structural member but that are not directly engaged with the intermediate structural member. In other words, a length of adhesive tape, when spanned across at least a subset set of depressions 60, will include sections 94 that are not directly stuck to a surface of the intermediate structural member.

As illustrated in the non-exclusive example of FIG. 6, intermediate structural members 16 and vehicle-body accessories 14 according to the present disclosure are not required to be planar. Accordingly, systems 10 may be configured for installation on a corresponding vehicle body having non-planar portions 26, to which systems 10 may be secured. In such embodiments, the plurality of discrete projections 50 may include a first subset 96 of discrete projections 50 that include support surfaces 54 that generally lie within a first common plane, and a second subset 98 of discrete projections 50 that include support surfaces 54 that generally lie within a second common plane. The non-exclusive embodiment of FIG. 6, though not required, also includes a subset 99 of discrete projections 50 that each include two support surfaces 54 that do not share a common plane with each other, but one of which shares a common plane with subset 96 and the other of which shares a common plane with subset 98. Other configurations of non-planar members 16 and corresponding accessories 14 are equally within the scope of the present disclosure.

Figures 7, 8:
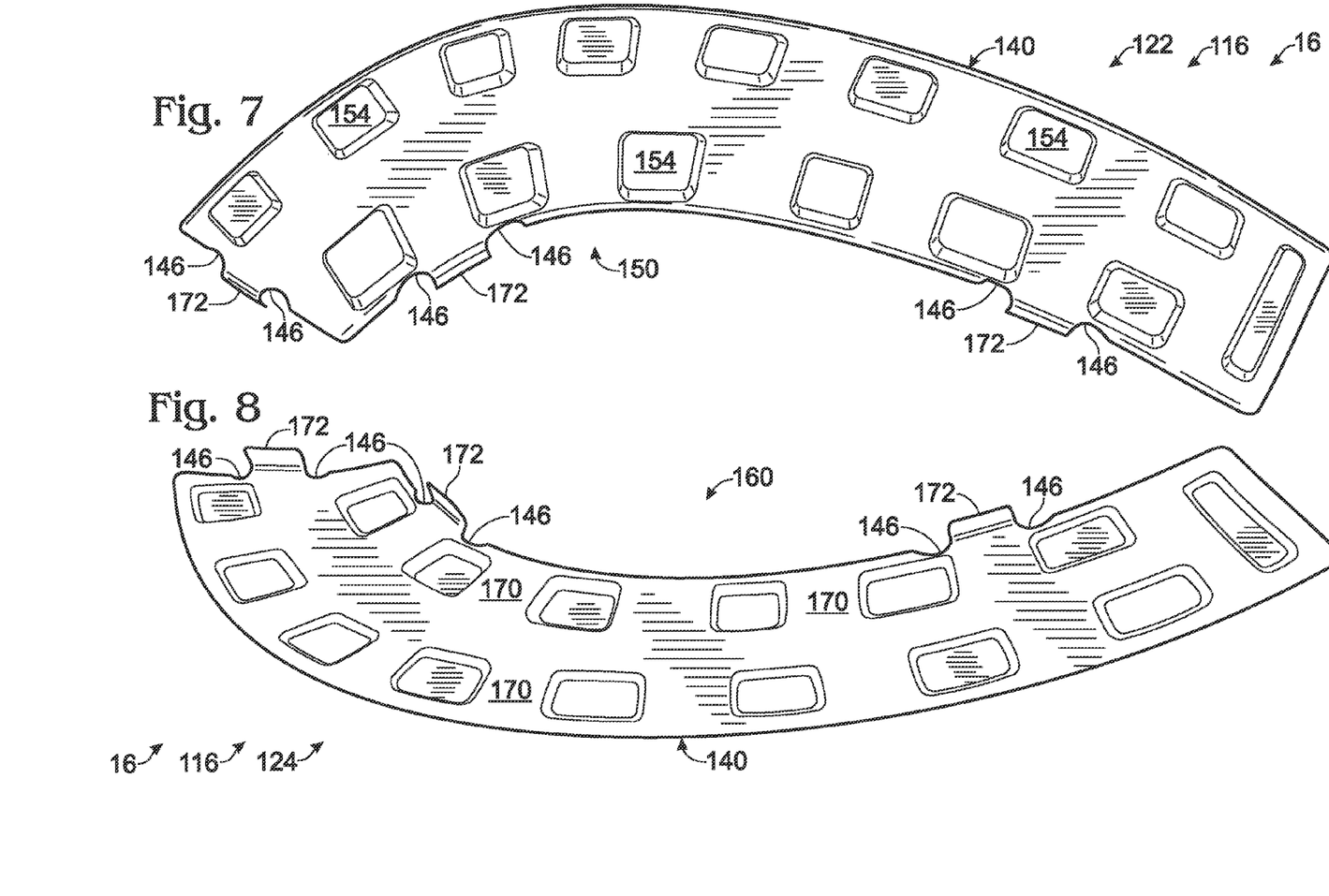
FIG. 7 is an isometric view of a non-exclusive example of an intermediate structural member according to the present disclosure, showing an outer side thereof.
FIG. 8 is an isometric view of the intermediate structural member of FIG. 7, showing the inner side thereof.

FIGS. 7 and 8 illustrate a non-exclusive example 116 of an intermediate structural member 16 configured to be used with a system for installation of a corresponding fender flare. FIG. 7 shows an outer side 122 configured to generally face and compliment an inner side of the corresponding fender flare, and FIG. 8 shows an inner side 124 configured to generally face and compliment an area of a corresponding vehicle body generally adjacent the vehicle's wheel well.

Intermediate structural member 116 includes a plurality of discrete projections 150 extending from, or on, outer side 122, each projection having a support surface 154 that is generally planar (as indicated on thee representative projections). Member 116 also includes a plurality of depressions 160 extending into, or on, inner side 124, and portions 170 of surface 124 adjacent depressions 160 (as indicated on three representative portions 170). Projections 150 and depressions 160 may be described as spanning a substantial length of intermediate structural member 116. Projections 150 and depressions 160 may also be described as spanning intermediate structural member 116 in two dimensions.

As illustrated in FIGS. 7 and 8, projections and corresponding depressions according to the present disclosure are not required to be uniform in size and shape for a given intermediate structural member, and intermediate structural member 116 is such an example.

Intermediate structural member 116 further includes three optional alignment tabs 172 extending from a periphery 140 of member 116. Periphery 140 (though not required) includes generally arcuate portions 146 adjacent each alignment tab 172.

Figure 9:
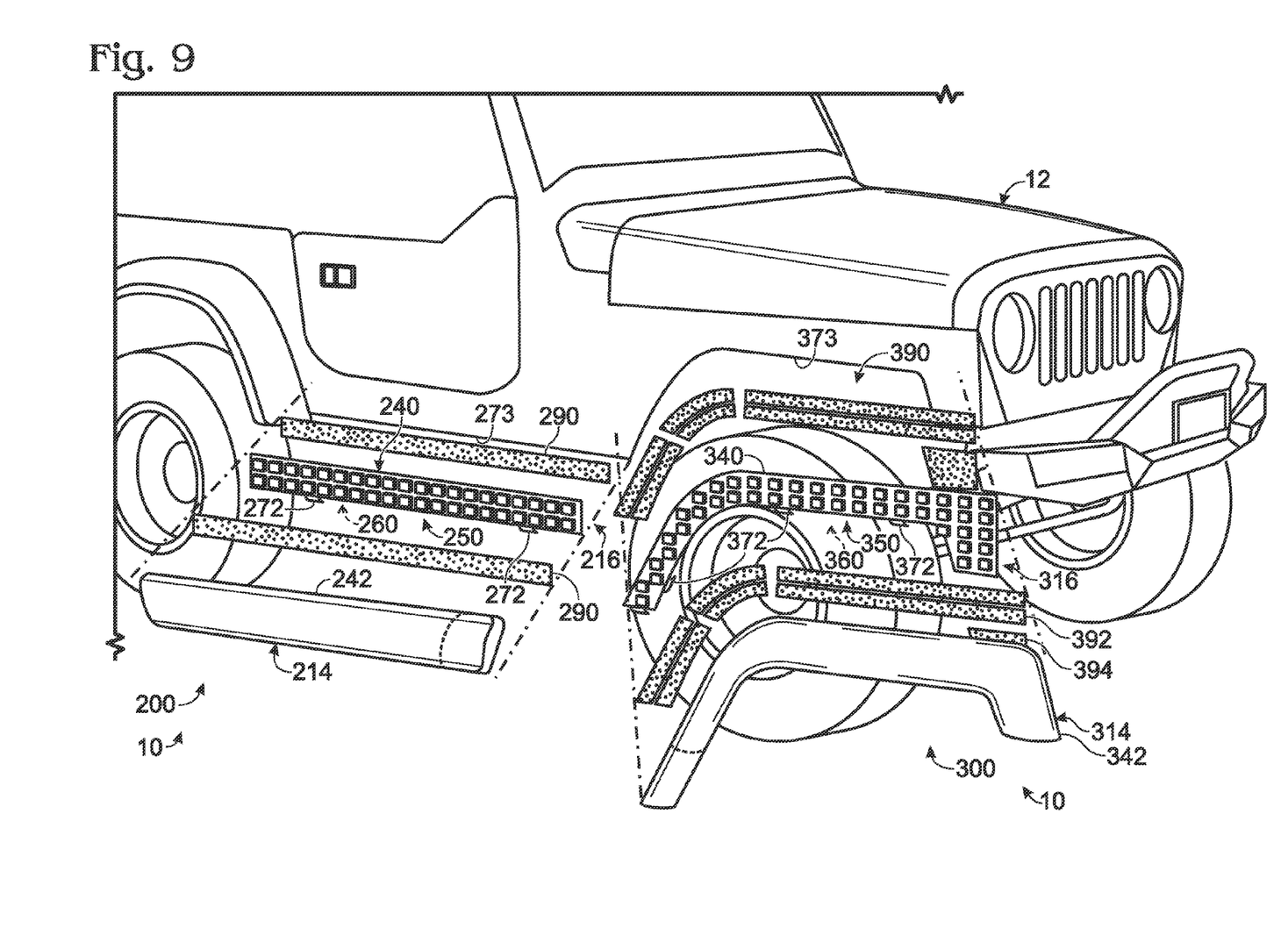
FIG. 9 is an isometric exploded view of two non-exclusive examples of systems for installing vehicle-body accessories on corresponding vehicle bodies according to the present disclosure, the systems shown together with a corresponding vehicle.

FIG. 9 illustrates two non-exclusive further examples of systems 10 according to the present disclosure, both systems shown in relation to a corresponding vehicle body 12.

A first system 200 includes a vehicle-body accessory in the form of a body side panel 214, an intermediate structural member 216 and two lengths of adhesive tape 290. As illustrated, member 216 includes a plurality of discrete projections 250 extending from an outer side thereof to compliment an inner side of the side panel 214. Projections 250 substantially span the length of member 216 in two rows. Member 216 also includes a pair of alignment tabs 272 configured to engage an underside edge 273 of the corresponding vehicle body 12. Lengths of adhesive tape 290 are sized and shaped to span both rows of projections 250 and the corresponding depressions 260 on the inner side of the member 216. Body panel 214 may be described as being configured to conceal, or encapsulate member 216 when system 200 is installed, because a periphery 240 of member 216 is smaller than a periphery 242 of panel 214. That is, panel 214 includes a pocket on the inner side thereof shaped and sized to receive, or house, member 216 when system 200 is installed.

A second system 300 includes a vehicle-body accessory in the form of a fender flare 314, an intermediate structural member 316 and several lengths of adhesive tape 390 in various shapes and sizes. As illustrated, member 316 includes a plurality of discrete projections 350 extending from an outer side thereof to compliment an inner side of the fender flare 314. Projections 350 substantially span the length of member 316. Member 316 also includes three alignment tabs 372 positioned to engage an underside edge 373 of the corresponding vehicle body's wheel well. Lengths of adhesive tape 390 are sized and shaped to span the plurality of discrete projections 350. For example, a first length 392 of adhesive tape is sized and shaped to span a single row of projections 350, and a second length 394 of adhesive tape is sized and shaped to span more than one row of projections 350. Fender flare 314 may be described as being configured to conceal, or encapsulate member 316 when system 300 is installed, because an outer periphery 340 of member 316 is smaller than an outer periphery 342 of flare 314. That is, flare 314 includes a pocket on the inner side thereof shaped and sized to receive, or house, member 316 when system 300 is installed.

The present disclosure encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

The invention claimed is:

1. A system for installing a vehicle-body accessory on a corresponding vehicle body, the system comprising:
a vehicle-body accessory having a first outer side configured to generally face away from the corresponding vehicle body and a second inner side configured to generally face toward the corresponding vehicle body; and
an intermediate structural member having a first outer side configured to generally face and compliment at least a portion of the second inner side of the vehicle-body accessory and a second inner side configured to generally face and compliment a portion of the corresponding vehicle body, wherein one of the first outer side of the intermediate structural member and the second inner side of the intermediate structural member includes a plurality of discrete projections, each projection having a support surface, wherein the support surfaces of one or more subsets of the plurality of discrete projections generally lie within a common plane and are positioned to compliment one of the second inner side of the vehicle-body accessory and the portion of the corresponding vehicle body.

2. The system of claim 1, wherein the support surfaces are generally planar.

3. The system of claim 1, wherein the vehicle-body accessory is a fender flare.

4. The system of claim 1, further comprising:
one or more lengths of adhesive material sized to span the one or more subsets of the plurality of discrete projections.

5. The system of claim 1, wherein the first outer side of the intermediate structural member includes the plurality of discrete projections and the support surfaces are configured to compliment the second inner side of the vehicle-body accessory.

6. The system of claim 1, wherein the second inner side of the intermediate structural member includes the plurality of discrete projections and the support surfaces are configured to compliment the corresponding vehicle body.

7. The system of claim 1, wherein the first outer side and the second inner side of the intermediate structural member both include the plurality of discrete projections, the first outer side of the intermediate structural member including a first subset of the plurality of discrete projections having support surfaces configured to compliment the second inner side of the vehicle-body accessory and the second inner side of the intermediate structural member including a second subset of the plurality of discrete projections having support surfaces configured to compliment the corresponding vehicle body.

8. The system of claim 1, wherein the intermediate structural member includes one or more alignment tabs extending from a periphery of the intermediate structural member, the one or more alignment tabs configured to engage corresponding structure on the vehicle body to position the intermediate structural member in a predetermined position relative to the vehicle body.

9. The system of claim 8, wherein the one or more alignment tabs are configured to be separated from a remainder of the intermediate structural member after the intermediate structural member is positioned in the predetermined position.

10. The system of claim 9, wherein the intermediate structural member has a thickness that is reduced between the one or more alignment tabs and the remainder of the intermediate structural member to facilitate separation of the one or more alignment tabs from the remainder of the intermediate structural member.

11. The system of claim 1, wherein the plurality of discrete projections spans a substantial length of the intermediate structural member.

12. The system of claim 1, wherein the intermediate structural member is sized to be substantially coextensive with the second inner side of the vehicle-body accessory.

13. The system of claim 1, wherein the intermediate structural member is sized to have an outer periphery that is smaller than an outer periphery of the vehicle-body accessory.

14. The system of claim 1, wherein the intermediate structural member is sized to be substantially concealed by the vehicle-body accessory when the vehicle-body accessory is coupled to the vehicle body.

15. The system of claim 1, wherein the intermediate structural member is sized to be generally housed within the vehicle-body accessory when the vehicle-body accessory is coupled to the vehicle body.

16. The system of claim 1, wherein the plurality of discrete projections spans the intermediate structural member in two dimensions.

17. A system for installing a vehicle-body accessory on a corresponding vehicle body, the system comprising:
an intermediate structural member having a first side and a second side, and a plurality of discrete projections extending from the first side, each projection defined by a support surface that is spaced from the first side and one or more side walls that extend around the support surface and interconnect the support surface with the first side, wherein the support surfaces of one or more subsets of the plurality of discrete projections generally lie within a common plane and correspond to one of an inner surface of a corresponding vehicle-body accessory and an outer surface of the corresponding vehicle body, and wherein the plurality of discrete projections spans the first side of the intermediate structural member in two dimensions.

18. The system of claim 17, wherein the intermediate structural member includes one or more alignment tabs extending from a periphery of the intermediate structural member, the one or more alignment tabs configured to engage corresponding structure on the vehicle body to position the intermediate structural member in a predetermined position relative to the vehicle body, the one or more alignment tabs being further configured to be separated from a remainder of the intermediate structural member after the intermediate structural member is positioned in the predetermined position.

19. The system of claim 17, wherein the second side includes a plurality of depressions corresponding to the plurality of discrete projections.

20. A method of installing a vehicle-body accessory on a corresponding vehicle body, the method comprising:
providing a vehicle-body accessory having a first outer side configured to generally face away from the corresponding vehicle body and a second inner side configured to generally face toward the corresponding vehicle body;
providing an intermediate structural member having a first side and a second side, wherein the first side includes either:
a plurality of discrete projections extending from the first side, the plurality of discrete projections including a first plurality of support surfaces; or
a plurality of discrete depressions extending into the first side, wherein the first side includes a first plurality of support surfaces adjacent to the plurality of discrete depressions; and wherein the second side includes either:
a plurality of discrete projections extending from the first side, the plurality of discrete projections including a second plurality of support surfaces; or
a plurality of discrete depressions extending into the first side, wherein the first side includes a second plurality of support surfaces adjacent to the plurality of discrete depressions;

providing a plurality of lengths of adhesive material;

securing at least a first length of adhesive material to at least a subset of the first plurality of support surfaces;

securing at least a second length of adhesive material to at least a subset of the second plurality of support surfaces;

positioning the intermediate structural member in a predetermined position relative to the corresponding vehicle body so that the first length of adhesive material secures the intermediate structural member to the corresponding vehicle body; and positioning the vehicle-body accessory in a predetermined position relative to the intermediate structural member so that the second length of adhesive material secures the vehicle-body accessory to the intermediate structural member.

21. The method of claim 20, wherein the intermediate structural member includes one or more alignment tabs extending from a periphery of the intermediate structural member, the one or more alignment tabs configured to engage corresponding structure on the vehicle body; and
wherein positioning the intermediate structural member includes aligning the one or more alignment tabs so that the one or more alignment tabs engage the corresponding structure on the vehicle body; and
wherein the method further comprises:
separating the one or more alignment tabs from a remainder of the intermediate structural member after positioning the intermediate structural member.

22. The method of claim 20,
wherein the first side includes a first plurality of discrete projections extending from the first side, the first plurality of discrete projections including the first plurality of support surfaces; and
wherein the second side includes a second plurality of discrete projections extending from the first side, the second plurality of discrete projections including the second plurality of support surfaces.

23. The method of claim 20,
wherein the first side includes a plurality of discrete projections extending from the first side, the plurality of discrete projections including the first plurality of support surfaces; and
wherein the second side includes a plurality of discrete depressions extending into the first side, wherein the first side includes the second plurality of support surfaces adjacent to the plurality of depressions.

24. The method of claim 20,
wherein the first side includes a plurality of discrete depressions extending into the first side, wherein the first side includes the first plurality of support surfaces adjacent the plurality of discrete depressions; and
wherein the second side includes a plurality of discrete projections extending from the first side, the second plurality of discrete projections including the second plurality of support surfaces.

25. The method of claim 20,
wherein the first side includes a plurality of discrete depressions extending into the first side, wherein the first side includes the first plurality of support surfaces adjacent to the plurality of discrete depressions; and
wherein the second side includes a plurality of discrete depressions extending into the first side, wherein the first side includes the second plurality of support surfaces adjacent to the plurality of depressions.

* * * * *